Patented Mar. 24, 1953

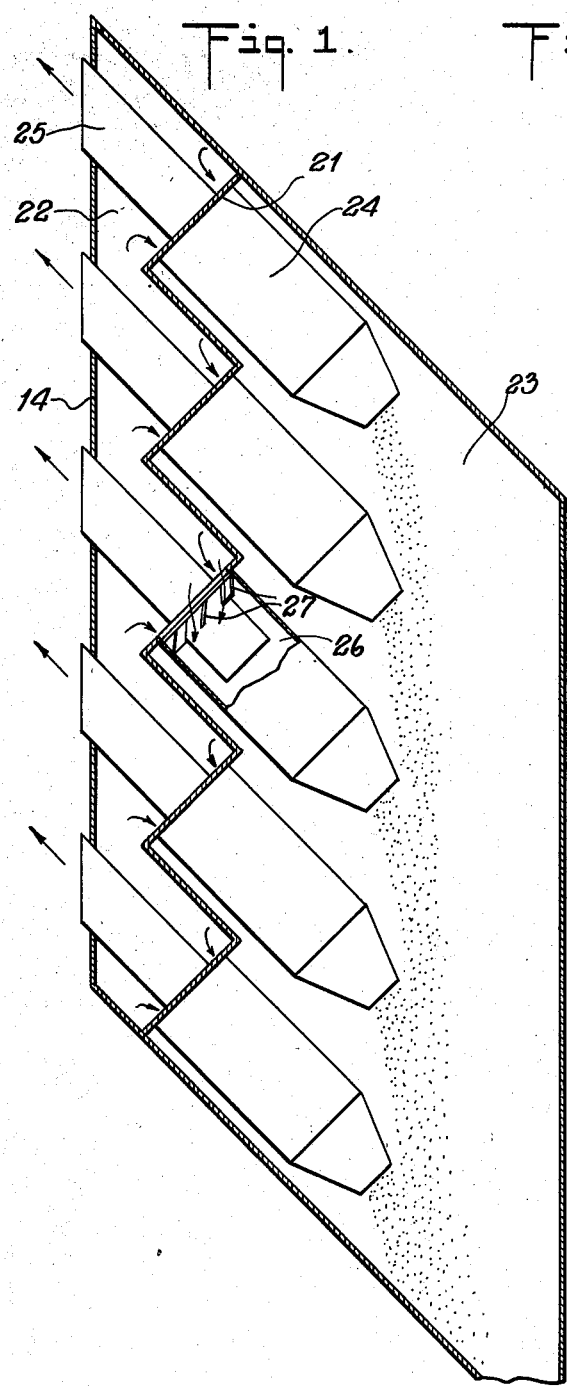
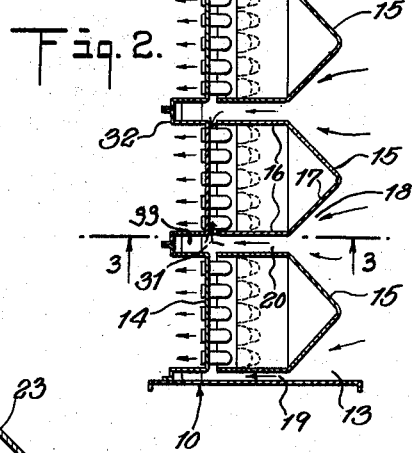
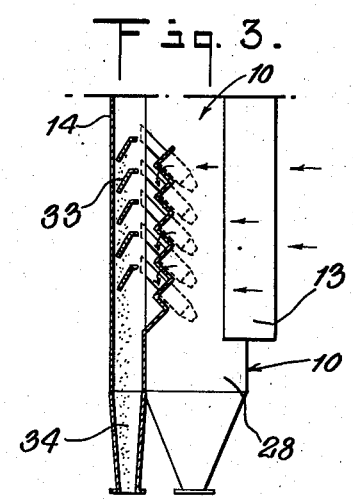

2,632,527

UNITED STATES PATENT OFFICE 2,632,527

APPARATUS FOR SEPARATING SUSPENDED PARTICLES FROM GASES

Charles B. McBride, Portchester, N. Y., and Philip F. Best, Riverside, Conn., assignors to The Thermix Corporation, Greenwich, Conn., a corporation of Connecticut Application August 3, 1950, Serial No. 177,367

5 Claims. (Cl. 183—80)

Our present invention relates to apparatus of the multi-tubular centrifugal type for separating suspended particles of solids or liquids carried in suspension by gas.

Generally in multi-tubular centrifugal apparatus of this type a large number of the centrifugal tubes have been arranged in a plenum chamber to which the dust laden gas was supplied. The gas necessarily came into contact first with those tubes nearest the point of supply and, finally, that portion of the gas which had not entered these tubes entered the tubes farthest from the point of supply. With such an arrangement a tendency for variation in pressure between different tubes, or tubes in different parts of the apparatus, was inherent with a consequent danger of unequal working of the tubes and re-entrainment of dust. Measures were adopted to overcome this tendency as much as possible by making a plenum chamber that diminished the direction of flow toward the more remote portions and, accordingly, making the off-take pipes from the centrifugal separating tubes of different lengths, being longer, to pass through those portions of the plenum chamber of greater height or cross-sectional dimensions.

Centrifugal apparatus of the above type was also used in connection with electric separators to give a preliminary separation of the suspended particles before passing into and through the electric precipitators. This involved another problem of again bringing the partially cleaned gas leaving the centrifugal separating apparatus into a uniform non-turbulent flow desirable for electric separators.

In our present invention we provide an arrangement of centrifugal separating tubes in which the necessity for the dust laden gas to pass a large number of tubes to reach certain more remote tubes is avoided and in which the gas passes through the apparatus with a minimum of pressure drop and with a uniform undisturbed flow.

In our invention we provide a supply chamber through which the gases flow toward the rear of the chamber. Immediately in advance of the rear wall of the chamber a number of separating chambers are provided with their side walls spaced from the opposing side walls of adjacent separating chambers and from the side walls of the supply chamber so as to provide passages, one on each side of each separating chamber.

The separating chambers are divided by a vertical partition spaced in advance of the rear wall of the supply chamber so as to divide each separating chamber into a plenum chamber between the partition and the rear wall of the supply chamber and a dust chamber in front of the plenum chamber.

Inlets are provided on each side wall of the plenum chamber to admit the particle carrying gases from the passages between the separating chambers so that gas may enter equally from each side.

In the partition wall are mounted groups of centrifugal tubes, each receiving the particle laden gases from the plenum chamber through rotatory inlets which give the gases a whirling movement to project the particles forwardly through the open end of the inlet into the dust chamber. The clean gases are withdrawn through outlet pipes which project into their respective centrifugal tubes from the rear wall of the separating chamber to form annular spaces in the centrifugal tubes into which the rotating gases are received from the inlets. The gases from which the dust has been thus centrifugally separated pass through the outlet pipes and through the rear wall of the supply chamber either to atmosphere or to an electric precipitator.

The separating chambers may be made relatively narrow so as to have but a few vertical rows of tubes as, for example, five, so that the particle carrying gases need pass but two tubes to reach the rearmost one from each side. Consequently there is no appreciable difference in pressure or distribution conditions for the centrifugal tubes and no substantial tendency for differences in pressure in the tubes or dust chambers to cause re-entry of the gases from the dust chamber and re-entrainment of the separated particles.

The outlet pipes from the centrifugal tubes are accordingly distributed uniformly throughout the area of the rear wall of the supply chamber. The gases delivered through the outlet pipes are, therefore, substantially uniformly delivered and with uniform pressure conditions. They flow without disturbances or turbulence from the rear wall of the supply chamber and are thereby suited for immediate precipitation. Such an electric precipitator may be placed immediately back of the rear wall of the supply chamber. This results in a very compact arrangement of the preliminary centrifugal separator and the electric precipitator.

In the event that the gases may carry larger or more massive particles, these may be thrown out in the passages by extending the passages between the separating chambers to the rear of the inlets to the plenum chamber and provide a baffle on which these particles may be caught.

The various features of the invention are illustrated in the accompanying drawings in which Fig. 1 is a vertical section of a centrifugal separator and centrifugal tubes embodying the invention, certain parts of the tubes being broken away to show the rotatory passages;

Fig. 2 is a horizontal section through the centrifugal separator showing the direction of flow;

Fig. 3 is a vertical section on the line 3—3 of Fig. 2.

The centrifugal separator as shown in the drawings comprises a chamber 13 through which the gases are delivered and pass toward a rear wall 14. Immediately in advance of the rear wall are provided a number of separating chambers 15, three being shown by way of example, each of which has a pair of side walls 16 and a front wall 17 which may be pointed forwardly to provide sloping or funnel shaped passages 18 in advance of the separating chambers.

The separating chambers are separated from each other laterally to form passages 20 and chambers adjacent the side walls of the supply chamber are spaced therefrom to form passages 19 into which the particle carrying gases are delivered from the funnel shaped inlets 18.

Inlet openings are provided immediately in advance of the rear wall 14 from each of the passages 19 and 20 into the separating chamber so that the gases may flow from each side into the rear portion of the separating chamber.

Each separating chamber is divided, as shown more clearly in Fig. 1, by a substantially vertical partition 21 in advance of the wall 14 into a plenum chamber 22 and a dust collecting chamber 23 immediately in advance of the plenum chamber.

As shown in Fig. 1 the wall 21 is of a stepped construction having faces slanted alternately in opposite directions. The partition may however be straight. Groups of centrifugal separating tubes 24 are mounted in the partition 21 and project forwardly and preferably downwardly into the dust collecting chamber 23. These tubes are also provided each with an off-take pipe 25 mounted in the rear wall 14 co-axially with its respective centrifugal tube 24 and open at both ends.

The off-take pipes extend into the centrifugal tubes for a distance short of the length of said tubes, as shown in the partly broken away tube of Fig. 1, to form an annular space 26 into which the gases are delivered from the plenum chamber 22 through the rotatory inlets of any suitable type.

In the specific form shown in Fig. 1 these rotatory inlets may be formed by portions of the wall 21 cut and bent at an angle into the annular space 26 so as to form inclined guide vanes 27 about the off-take pipe 25. The dust laden gases supplied to the plenum chamber, therefore, flow through the rotatory passages with a continuous whirling movement through the annular passage 26, the momentum of the particles throws them forwardly through the forward open end of the centrifugal tubes into the dust chamber 23 while the direction of movement of the gases is reversed and pass outwardly through the off-take pipes 25.

The separating chambers may be made as narrow as desired, but when made of a dimension to take five sidewise spaced vertical rows of tubes, each tube is quite close to the inlet openings. The second row of tubes from each side is supplied with gases which need pass but one row of tubes. The middle row is supplied with gases which pass two rows of tubes but is supplied from each side. As a consequence pressure conditions throughout the width and height of the plenum chamber are substantially uniform with a minimum of changes in pressure.

Flow conditions through the centrifugal tubes are correspondingly equalized so that there is a minimum tendency for unequal pressures in the dust chamber to cause re-entrainment. Also the off-take pipes are spaced substantially uniformly, which combines with the uniform delivery of the gas from each off-take, producing a uniform distribution of flow to the centrifugal separating unit 11.

Suitable dust receiving hoppers 28, 29 and 30 are provided respectively for the dust collecting chambers 23 and the precipitating units 11 and 12.

The particle carrying gases flow toward the rear wall 14, of the delivery chamber with increased velocity, which is imparted to the particles carried. As the direction of the gases changes to enter the separating chambers through the inlets, as illustrated at 31 in Fig. 2, the heavier particles are thrown by their momentum rearwardly and may be received in vertical channels 32 formed in the rear wall 14. Inclined baffles 33 are provided in the channels to catch the particles and throw them downwardly into a suitable hopper 34.

Through the above invention we have provided a centrifugal dust separating apparatus in which the gases flow with a minimum of disturbance and pressure drop to provide an undisturbed uniform stream of cleaned gas and in which the distribution to the centrifugal tubes is direct and equal.

It may be noted also that the plenum chamber formed between the rear wall 14 and the partition 21, or 35, is narrow inasmuch as the flow through this plenum chamber is for only short distances and, consequently, the off-take pipes 25 and 39 may be made of minimum length thus saving in the quantity of pipe required and in frictional losses.

Having described our invention, what we claim is:

1. Apparatus for separating suspended particles from a gas which comprises a supply chamber having an erect rear wall, separating chambers extending forwardly of said rear wall and spaced sidewise to provide a passage at each side of each chamber, a partition in each separating chamber spaced from said rear wall to divide each said chamber into a plenum compartment between said partition and said wall having an inlet from each of the passages on opposite sides of said separating chamber and a dust collecting compartment in advance of said plenum chamber and separating elements for each separating chamber each comprising a centrifugal tube mounted in said partition and extending into and opening into said dust chamber, an open ended off-take pipe in said rear wall and extending into its respective centrifugal tube to form an annular space therein and rotatory inlets from said plenum chamber to said annular spaces.

2. The apparatus of claim 1, in which said rear wall has a vertical channel aligned with each said passage and vertically spaced baffles in said channels.

3. The apparatus of claim 1 in which said separating chambers are converged forwardly to provide converging inlets to said passages.

4. The apparatus of claim 1 in which said partition is alternately inclined in vertical sequence in opposite directions and in which said separating elements are mounted in said inclined surfaces at a right angle to the lengths of said elements.

5. The apparatus of claim 1 in which the partition is slit to form inclined vanes into the annular space between each centrifugal tube and its respective outlet pipe.

CHARLES B. McBRIDE.
PHILIP F. BEST.

REFERENCES CITED

The following references are of record in the file of this patent:

UNITED STATES PATENTS

| Number | Name | Date |
|---|---|---|
| 1,997,125 | Soyez et al. | Apr. 9, 1935 |
| 2,268,170 | Schmidt | Dec. 30, 1941 |
| 2,323,707 | Danz | July 6, 1943 |
| 2,327,691 | Allardice | Aug. 24, 1943 |
| 2,337,684 | Scheineman | Dec. 28, 1943 |
| 2,360,355 | McBride et al. | Oct. 17, 1944 |
| 2,372,514 | Pootjes | Mar. 27, 1945 |
| 2,472,995 | Watson et al. | June 14, 1949 |
| 2,583,921 | Yellott | Jan. 29, 1952 |

FOREIGN PATENTS

| Number | Country | Date |
|---|---|---|
| 402,693 | Great Britain | Dec. 7, 1933 |
| 580,936 | Great Britain | Sept. 25, 1946 |